United States Patent
Malkamaki et al.

(10) Patent No.: US 10,939,357 B2
(45) Date of Patent: Mar. 2, 2021

(54) INTEGRATED ACCESS AND BACKHAUL ADAPTATION LAYER STATUS REPORT

(71) Applicant: Nokia Solutions and Networks Oy, Espoo (FI)

(72) Inventors: Esa Malkamaki, Espoo (FI); Arpad Drozdy, Espoo (FI); Henri Koskinen, Espoo (FI); Dawid Koziol, Glogow (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 7 days.

(21) Appl. No.: 16/444,249

(22) Filed: Jun. 18, 2019

(65) Prior Publication Data

US 2020/0015147 A1    Jan. 9, 2020

Related U.S. Application Data

(60) Provisional application No. 62/693,907, filed on Jul. 3, 2018.

(51) Int. Cl.
*H04W 40/36* (2009.01)
*H04W 40/22* (2009.01)
(Continued)

(52) U.S. Cl.
CPC ........... *H04W 40/36* (2013.01); *H04W 28/04* (2013.01); *H04W 40/22* (2013.01); *H04W 80/02* (2013.01); *H04W 88/085* (2013.01); *H04W 92/12* (2013.01)

(58) Field of Classification Search
CPC ..... H04W 40/36; H04W 28/04; H04W 40/22; H04W 80/02; H04W 36/08; H04W 88/085; H04W 36/0055; H04W 92/12; H04W 12/06; H04W 72/085; H04W 88/06; H04W 76/27; H04W 12/04; H04W 76/20; H04W 72/04; H04W 84/12; H04W 24/10;

(Continued)

(56) References Cited

U.S. PATENT DOCUMENTS

2012/0257509 A1    10/2012   Natarajan et al.
2018/0167814 A1*   6/2018    Fujishiro ............... H04W 88/06

(Continued)

FOREIGN PATENT DOCUMENTS

WO        2017/172265 A1    10/2017

OTHER PUBLICATIONS

"3rd Generation Partnership Project; Technical Specification Group Radio Access Network; Study on Integrated Access and Backhaul; (Release 15)", 3GPP TR 38.874, V0.2.1, May, 2018, pp. 1-20.

(Continued)

*Primary Examiner* — Jung Liu
(74) *Attorney, Agent, or Firm* — Squire Patton Boggs (US) LLP

(57) ABSTRACT

According to a first embodiment, a method may include receiving, by a source network entity, a trigger. The method may further include, in response to receiving a trigger, generating, by the source network entity, at least one adaptation layer status report indicating at least one adaptation layer protocol data unit. The method may further include transmitting, by the source network entity, the at least one adaptation layer status report to a target network entity.

18 Claims, 8 Drawing Sheets

(51) Int. Cl.
  *H04W 28/04* (2009.01)
  *H04W 92/12* (2009.01)
  *H04W 80/02* (2009.01)
  *H04W 88/08* (2009.01)

(58) Field of Classification Search
  CPC ... H04W 16/26; H04W 84/047; H04W 92/02; H04L 1/1874; H04L 2001/0097; H04L 63/0876; H04B 7/15542; H04B 7/2606
  See application file for complete search history.

(56) References Cited

U.S. PATENT DOCUMENTS

| | | | | |
|---|---|---|---|---|
| 2018/0198566 | A1* | 7/2018 | Yi | H04W 28/02 |
| 2019/0159277 | A1* | 5/2019 | Zhu | H04W 88/04 |
| 2019/0223078 | A1* | 7/2019 | Sirotkin | H04B 7/155 |
| 2019/0289492 | A1* | 9/2019 | Hampel | H04W 28/0252 |
| 2019/0297529 | A1* | 9/2019 | Hampel | H04W 72/10 |
| 2019/0387437 | A1* | 12/2019 | Cho | H04W 88/06 |
| 2019/0394823 | A1* | 12/2019 | Jo | H04W 76/11 |
| 2020/0007223 | A1* | 1/2020 | Zhu | H04B 7/2606 |
| 2020/0029391 | A1* | 1/2020 | Xu | H04W 80/08 |
| 2020/0068581 | A1* | 2/2020 | Xu | H04L 1/1841 |

OTHER PUBLICATIONS

"3rd Generation Partnership Project; Technical Specification Group Radio Access Network; NR; Radio Link Control (RLC) protocol specification (Release 15)", 3GPP TS 38.322 V15.1.0, Mar. 2018, pp. 1-33.

"3rd Generation Partnership Project; Technical Specification Group Radio Access Network; NR; Packet Data Convergence Protocol (PDCP) specification (Release 15)", 3GPP TS 38.323, V15.1.0, Mar. 2018, pp. 1-25.

"Adaptation Layer and Routing for IAB in NR", 3GPP TSG-RAN Working Group 3 meeting #100, R3-183169, Agenda: 24.1.2, Intel Corporation, May 21-25, 2018, pp. 1-6.

"Considerations on Adaptation Layer in IAB", 3GPP TSG-RAN Working Group 3 meeting #100, R3-182788, Agenda: 24.1.1, ZTE, May 21-25, 2018, 5 pages.

"Setup Procedure for the Adaptation Layer of an IAB System", 3GPP TSG-RAN Working Group 3 meeting #100, R3-182779, Agenda: 241.2, Ericsson, May 21-25, 2018, pp. 1-4.

"L2 Reordering and Retransmission Functions", 3GPP TSG-RAN Working Group 2 meeting #95bis, R2-166195, Agenda: 9.21.1, Huawei, Oct. 10-14, 2016, 5 pages.

* cited by examiner

INTEGRATED ACCESS AND BACKHAUL ADAPTATION LAYER STATUS REPORT

CROSS REFERENCE TO RELATED APPLICATIONS

This application claims priority from U.S. Provisional Application No. 62/693,907, filed on Jul. 3, 2018. The entire contents of this earlier filed application are hereby incorporated by reference in their entirety.

BACKGROUND

Field

Certain embodiments may relate to wireless communication systems. For example, some embodiments may relate to self-backhauling.

Description of the Related Art

Self-backhauling has become an important aspect of 5G networking technology. With increasing requirements of mobile network capacity, additional needs have been placed on higher network frequencies, especially frequencies over 20 GHz. However, with limited link budgets of these higher frequencies, millimeter-wave networks have become more significant, and have created additional interest in beamforming techniques. Self-backhauling offers a solution to decrease backhaul deployment costs by improving backhaul deployment.

A self-backhauling network entity can utilize its mobile radio access interface to connect autonomously to other network entities. Integrated access and backhaul (IAB) techniques may be used for situations where the mobile access and backhaul may use the same interface, radio circuitry, and spectrum.

An IAB node may be like a gNB-DU (distributed unit), and may contain physical (PHY), medium access control (MAC), and radio link control (RLC) layers, while a packet data convergence protocol (PDCP) and/or service data adaptation protocol (SDAP) layer may be in a central unit of a next generation node B (gNB-CU). In the IAB tree, part of which is illustrated in FIG. 1, data is transferred over wireless self-backhauling links. Furthermore, an adaptation layer may be used on top of the PHY/MAC/RLC layers. The adaptation layer would be used at least for routing within the IAB tree, but it has been proposed to be used also for aggregating different UE bearers into IAB specific bearers/RLC channels. In a hop-by-hop RLC ARQ configuration, as illustrated in FIG. 1, the adaptation layer is on top of the RLC layer.

It should be noted that each IAB node comprises a Distributed Unit (DU) part and Mobile Termination (MT) part as illustrated in FIG. 2. The former serves Access UEs as well as MT parts of child IAB nodes. MT part can simply be seen as a UE residing inside the IAB node.

However, one of the challenges with hop-by-hop ARQ is the lossless data delivery in the event of IAB node mobility, or more specifically, how to deliver data which has reached a given IAB node on an old path to an IAB node on a new path, or any intermittent radio link issue that causes a hop-by-hop ARQ to fail. As illustrated in FIG. 3, user equipment (UE) is connected to IAB node (2b) and IAB node (2b) is initially connected to IAB node (1a). Downlink (DL) packets for the UE originating in the Donor DU are then originally transferred via IAB node (1a) to IAB node (2b), which subsequently delivers the DL packets to the access UE. While the connection is ongoing, for instance, during a disturbance such as blockage, IAB node (2b) may perform a handover and may connect to IAB node (1b). After the handover, the DL data, which has already reached IAB node (1a), but not IAB node (2b) yet, should be forwarded to IAB node (1b).

BRIEF DESCRIPTION OF THE DRAWINGS

For proper understanding of this disclosure, reference should be made to the accompanying drawings, wherein.

SUMMARY

Figure 1:
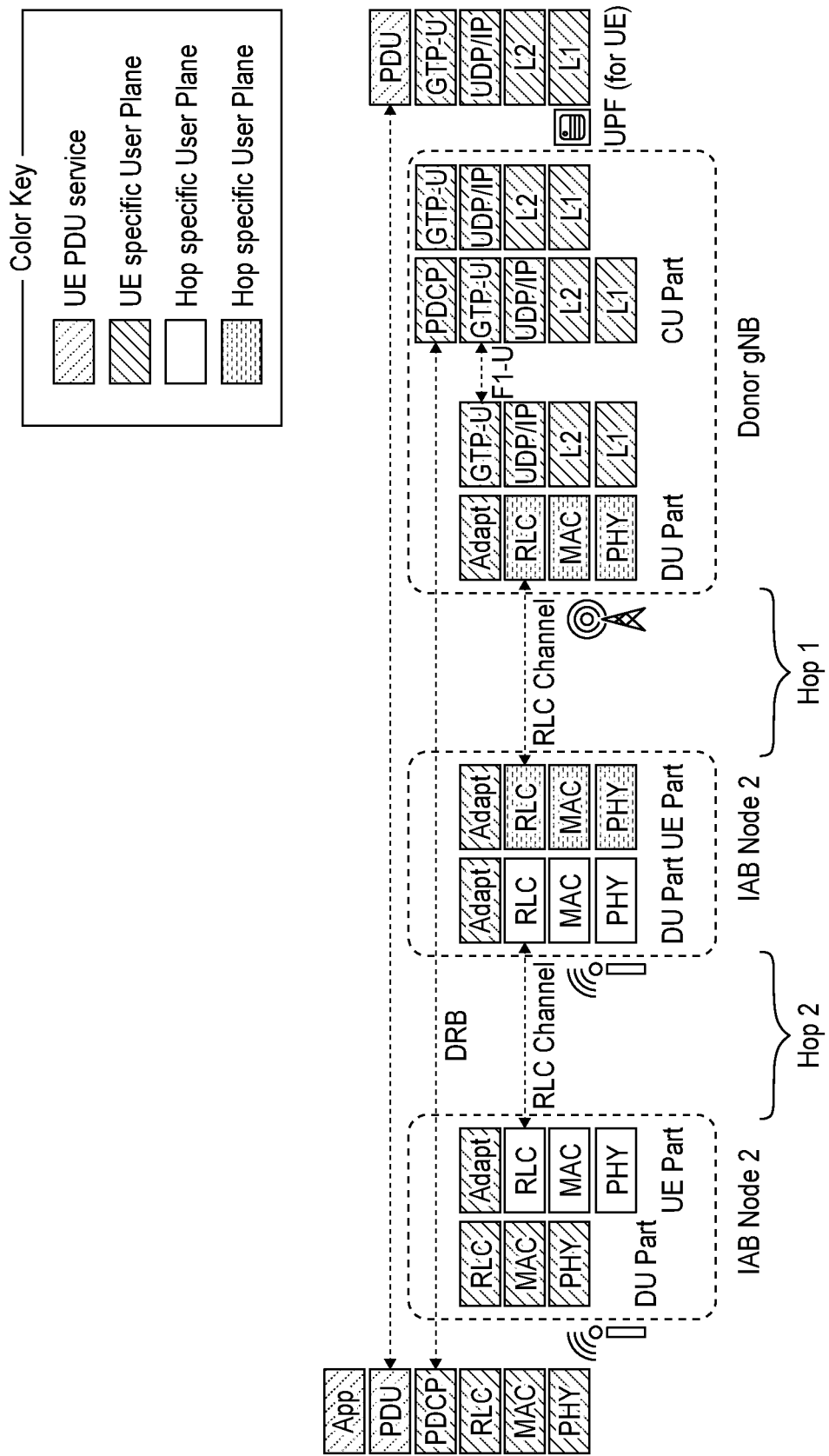
FIG. 1 illustrates a multi-hop L2 relaying with an adaptation layer above RLC.
Figure 2:
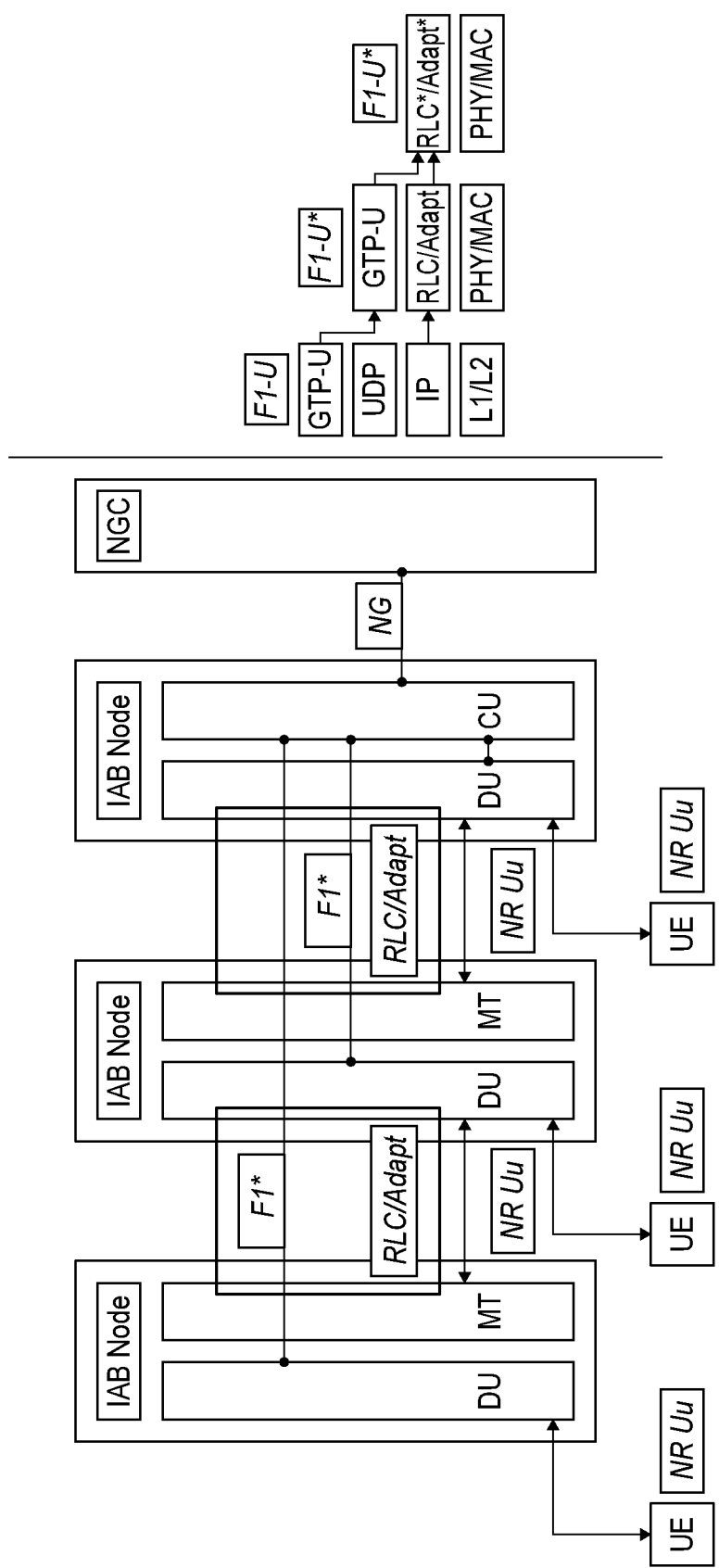
FIG. 2 illustrates a reference diagram for architecture in hop-by-hop RLC ARQ.

In a first aspect thereof the exemplary embodiments of this invention provide a method that comprises receiving, by a source network entity, a trigger; generating, in response to receiving the trigger, at least one adaptation layer status report indicating at least one adaptation layer protocol data unit; and transmitting the at least one adaptation layer status report to a parent network entity.

In a further aspect thereof the exemplary embodiments of this invention provide an apparatus that comprises at least one data processor and at least one memory that includes computer program code. The at least one memory and computer program code are configured, with the at least one data processor, to cause the apparatus, at least to receive, by the apparatus, a trigger; generate, in response to receiving the trigger, at least one adaptation layer status report indicating at least one adaptation layer protocol data unit; and transmit the at least one adaptation layer status report to a parent network entity.

In another aspect thereof the exemplary embodiments of this invention provide an apparatus that comprises at least one data processor and at least one memory that includes computer program code. The at least one memory and computer program code are configured, with the at least one data processor, to cause the apparatus, at least to receive, by the apparatus, at least one adaptation layer status report indicating at least one adaptation layer protocol data unit from a source network entity of unsuccessful delivery; determine whether the apparatus has data buffered; transmit data associated with the at least one adaptation layer status report to a target network entity upon determining that the apparatus has data buffered; and forward the at least one adaptation layer status report to the apparatus's parent network entity upon determining that the apparatus has no data buffered.

DETAILED DESCRIPTION

Certain embodiments described herein may help to manage handover procedures. The example embodiments described herein may have various benefits and/or advantages. For example, some embodiments may increase the reliability of data delivery. For example, in the case of ultra-reliable low latency communications where data delivery is critical, certain embodiments ensure that in-transit PDUs are delivered reliably. Furthermore, some embodiments provide an additional layer of secure and fast retransmissions. With an individual hop, there can be a PHY/MAC layer hybrid ARQ combined with an RLC layer ARQ, where a failure, obstruction, or any intermittent problem on the link may cause hop-by-hop retransmissions to fail; thus, certain embodiments may provide an additional layer of reliability where PDUs are automatically retransmitted/re-routed from a network entity. Some embodiments may also correct data delivery failures caused by any number of reasons with as low a response time as possible. Certain embodiments are, therefore, directed to improvements in computer-related technology, specifically, by conserving network resources and reducing power consumption of network entities and/or user equipment located within the network.

In some embodiments, an IAB network, on top of an RLC hop-by-hop ARQ with hop-by-hop status reports, may have an adaptation layer status report that spans more hops, and may request for the retransmission or re-routing of PDUs that could not reach their destination over the IAB network. This may increase the reliability of data delivery over an IAB network.

In certain embodiments, the status report may also allow confirming the end-to-end delivery of PDUs to enable clearing PDUs from retransmission buffers, both in the intermediate IAB nodes as well as at the Donor DU/CU. Furthermore, the adaptation layer status reports may be defined for at least two purposes. First, the adaptation layer status reports may be used end-to-end between the endpoints of the adaptation layer, for example, Donor gNB-DU (or Donor gNB) and UE serving IAB node, thus being generated at one of the end points. Second, particularly in the case of re-routing requests, the adaptation layer status reports may be generated at some intermediate IAB node.

Status reports may differ depending upon the trigger. For instance, the end-to-end status report may be an ACK-only report used for clearing data from retransmission buffers, while an intermediate node generated report may be NACK-only report requesting retransmission/re-routing.

In various embodiments, instead of a control-PDU type of status report, the re-routing request may take the form of a field in the header of an undelivered and returned adaptation-layer PDU. This could reduce the need for buffering and book-keeping of PDUs in different nodes. The reference to identify adaptation-layer PDUs need not be a separate sequence number defined at the adaptation layer, but an upper-layer sequence number, such as PDCP SN, can instead be inspected and used at the adaptation layer. The length of the PDCP SN could be provided in the adaptation layer header.

Figure 3A:
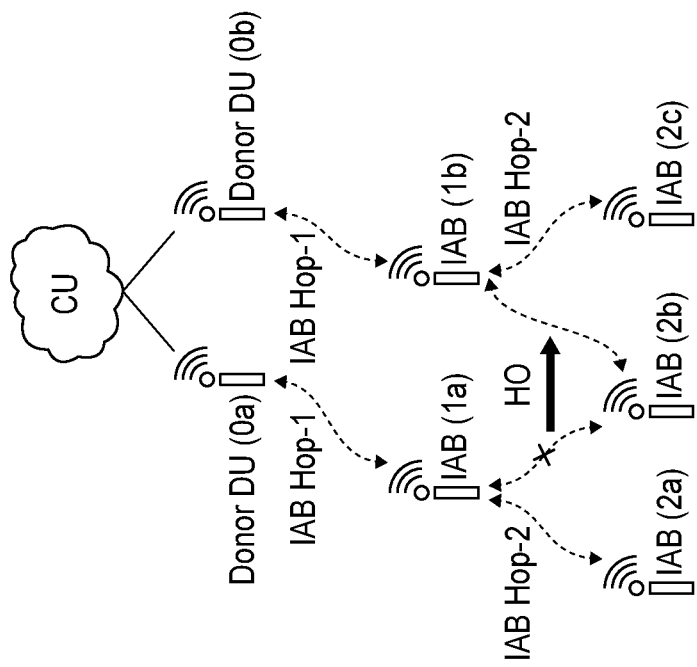
FIG. 3A illustrates an example of an integrated access and backhaul tree.

One solution to the data forwarding issue is to introduce adaptation layer status reports. As illustrated in FIG. 3a, when IAB node (2b) makes a HO, IAB node (1a) may generate an adaptation layer status report, either automatically or based on its configuration. IAB node (2b) may then send it to its parent node, such as an IAB node or Donor DU, as illustrated by Donor DU (0) in FIG. 3a. The parent node may forward the status report further to its parent, if needed. The status report may then be forwarded to the node where the traffic is re-routed due to the HO.

When the re-routing node receives the adaptation layer status report, it may retransmit the adaptation layer PDUs indicated by the adaptation layer status report. In some embodiments, the adaptation layer may be specified in a PDCP protocol outer header, for example, where the additional header would be put on top of the PDCP PDU, which may already contain sequence numbers. Those sequence numbers may be used for the report sent via the adaptation layer. Another possibility may be for the adaptation layer to introduce its own sequence numbering, which may impose more overhead, but would allow for the adaptation layer to be disassociated from the PDCP.

Figure 3B:
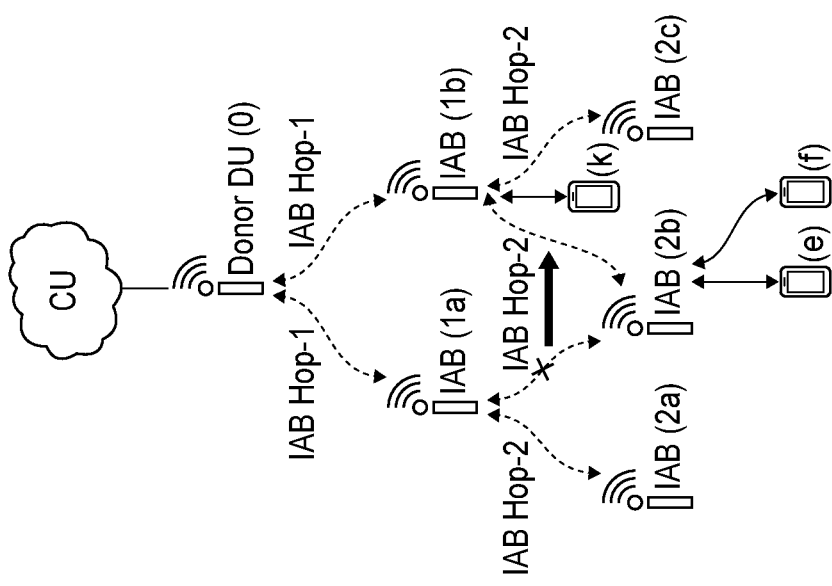
FIG. 3B illustrates another example of an integrated access and backhaul tree

In some embodiments, the status report is always forwarded to Donor DU if only the Donor DU buffers the adaptation layer PDUs. The Donor DU may then either retransmit the adaptation layer PDUs, or alternatively, the Donor DU may convert the adaptation layer status report to a downlink data delivery status (DDDS) report, which is sent over an F1 interface in the GTP-U header to Donor CU, in which case the PDCP layer in the Donor CU may retransmit the pending PDCP PDUs. Only the latter may be available when the Donor DU changes when an IAB node makes a HO, such as illustrated in FIG. 3b.

An alternative solution to the data forwarding issue is to forward the actual data, for example, returning the undelivered adaptation layer PDUs. The benefit is that there is no need for bookkeeping of PDCP sequence numbers.

Some embodiments may include using adaptation layer status reporting on top of RLC hop-by-hop ARQ, which may be IAB bearer specific (or IAB RLC channel specific), and may use hop-by-hop RLC status reports. An IAB bearer/RLC channel may aggregate adaptation layer PDUs from several access UEs.

In some embodiments, an adaptation layer status report may be UE bearer specific since an adaptation layer may be UE bearer specific. For example, an adaptation layer header may contain one or more of a UE ID, UE specific bearer ID, or a combined UE bearer ID indicating both the corresponding UE and the bearer. In addition, multiple UEs adaptation layer status reports could be optionally combined together, and/or multiplexed to the same IAB bearer/RLC channel. In some embodiments, an adaptation layer status report could use PDCP sequence numbers (SN). The adaptation layer status report could then report successfully delivered and/or missing PDCP PDUs, alleviating the need for an adaptation layer to have its own SNs.

In some embodiments, using PDCP SNs in an adaptation layer status report may require that the IAB node knows the length of the PDCP SN. It may be indicated in the adaptation layer header or, if GTP-U header is included, the PDCP SN length may be included in the GTP-U header. Alternatively, F1AP control protocol may be used, which may require configuring all IAB nodes with the same PDCP SN length.

One of the benefits of an adaptation layer status report may be avoiding defining an adaptation layer state and an adaptation layer state machine. Therefore, timers or other adaptation layer internal triggers may not need to be defined. The adaptation layer status report may be triggered "from outside." One type of trigger may be when a RLC status report is received from access UE for DL data, an e2e adaptation layer status report is triggered in the UE serving IAB node and sent to a donor DU. Another type of trigger may be when an IAB node makes HO, an adaptation layer status report is triggered in the intermediate source IAB node and sent to the parent node of the source IAB node, for example, to the direction of the donor DU for DL data. Another type of trigger is when there is a blockage and the UL data cannot be forwarded on an alternative link, an adaptation layer status report is triggered in the IAB node experiencing the blockage and it is sent to the child IAB node of that IAB node from where the UL data was received, for example, to the direction of the UE serving IAB node for UL data. Another type of trigger may be when a dual connected IAB node switches legs Finally, another type of trigger may be when a hop-by-hop RLC ARQ procedure fails for example due to reaching the maximum number of retransmissions.

Certain embodiments may include an adaptation layer with bookkeeping of successfully and unsuccessfully delivered PDCP PDUs. In some embodiments, intermediate nodes may only report unsuccessful PDCP PDUs, such as those that are still undelivered/unacknowledged when the adaptation layer status report is triggered and only the end nodes of the adaptation layer, that is the UE serving IAB node and the donor DU, would report also successfully delivered PDCP PDUs.

In some embodiments, the adaptation layer may additionally contain information about whether a carried radio bearer uses Unacknowledged Mode (UM) or Acknowledged Mode (AM), so that the status report is only triggered for those using AM mode since these require lossless delivery.

In some embodiments, the adaptation layer may buffer the adaptation layer PDUs, for the purpose of possible retransmission when an adaptation layer status report indicating unsuccessful delivery is received. The adaptation layer PDUs may be buffered at every IAB node along the data path until an e2e adaptation layer status report is received, or a report indicating unsuccessful delivery is received and the original data path is no longer valid and no alternative path is known for the PDUs (in which case the intermediate report should be forwarded further back on the now-obsolete path). The adaptation layer buffering may be configurable and implementation dependent.

In some embodiments, an adaptation layer status report may be needed where a PDCP status report is optional, and if used, the PDCP status report may be triggered only at HO or data recovery. In an IAB network, PDCP layers may only be at both ends, such as at an access UE and Donor CU. Thus, a PDCP status report may be triggered only when the access UE performs a handover and/or when the IAB node performs a handover that changes the donor. If an IAB node in an intermediate hop performs a handover, PDCP may not trigger a status report. The proposed adaptation layer status report may provide a technique of forwarding DL data, for example, in requesting adaptation layer retransmission/re-routing (or PDCP retransmission).

In some embodiments, instead of being defined for adaptation layer, a new status report spanning more hops could be defined for RLC layers implying two levels of RLC layers and RLC status reports. Specifically, a hop-by-hop RLC and RLC status report may be specified for IAB aggregated bearers/RLC channels and UE specific RLC and RLC status report spanning over the multiple hops. The new status reporting may also be specified for the "lower part" of PDCP, implying that part of the PDCP layer and functionality may also be introduced in the IAB nodes.

As mentioned above, FIG. 3a illustrates IAB node (2b) handing over from parent node IAB node (1a) to IAB node (1b), necessitating data transfer from (1a) to (1b). The benefit of this solution is an increased reliability of data delivery. Especially in the case of ultra-reliable low latency communications, it may be critical to deliver all data in time. By employing this method, the handover of an IAB node, or any similar event on the IAB network, may not prevent some in-transit PDUs to be delivered reliably.

Furthermore, it may add an extra layer of secure and fast retransmissions. While on every individual hop, there may be a PHY/MAC layer hybrid ARQ combined with an RLC layer ARQ, a failure, obstruction, or any intermittent problem on that link can cause those hop-by-hop retransmissions to fail. In this case, a retransmission from the remote server on the other side of the Internet in many cases may be too slow. Therefore, it may be beneficial to have an additional layer of reliability, where PDUs may be automatically retransmitted/re-routed from the donor gNB (or an intermittent IAB node). This would correct data non-deliveries caused by a multitude of reasons with the lowest response time that is possible.

Figure 4:
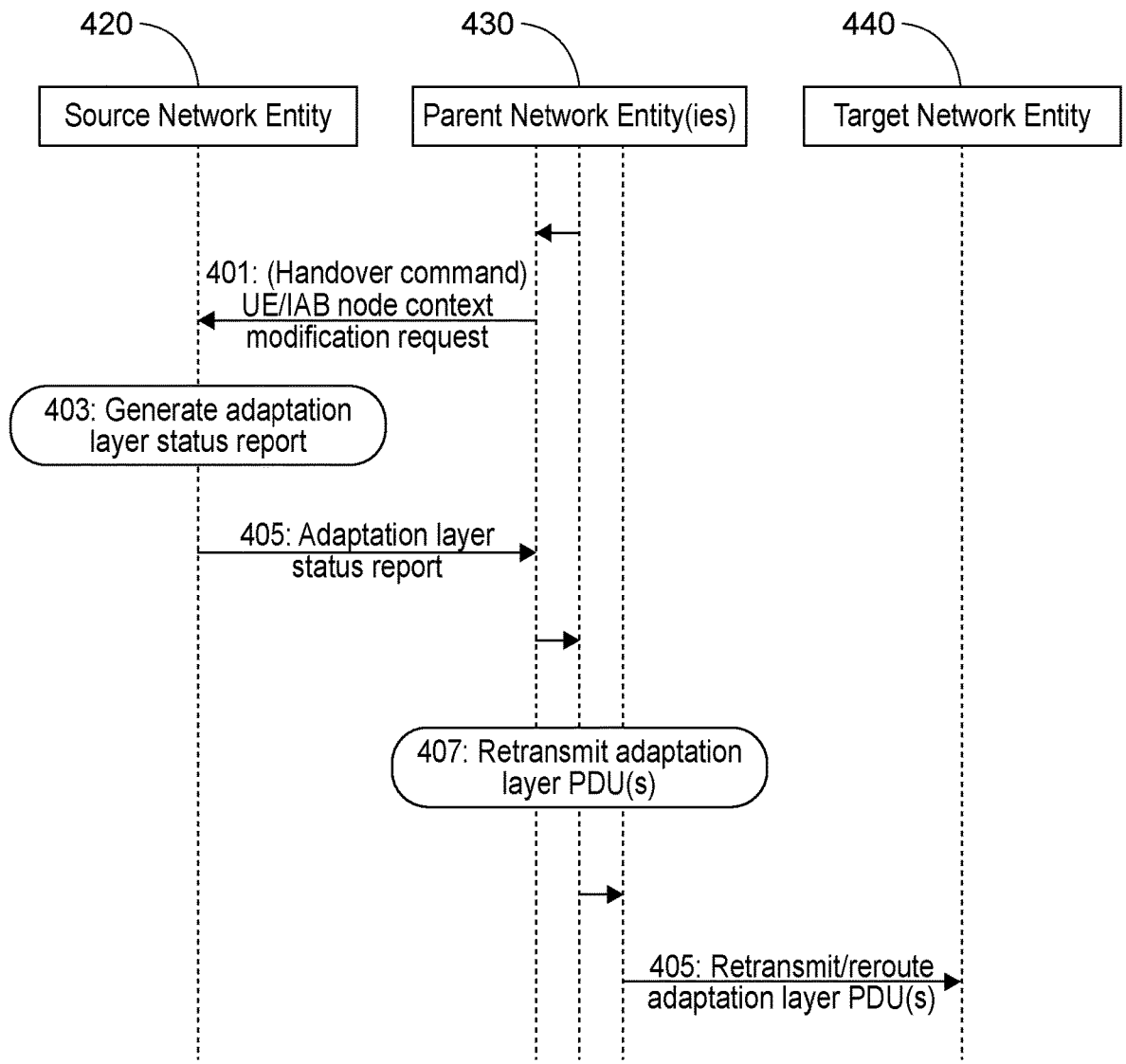
FIG. 4 illustrates a signaling diagram according to certain embodiments.
Figure 8:
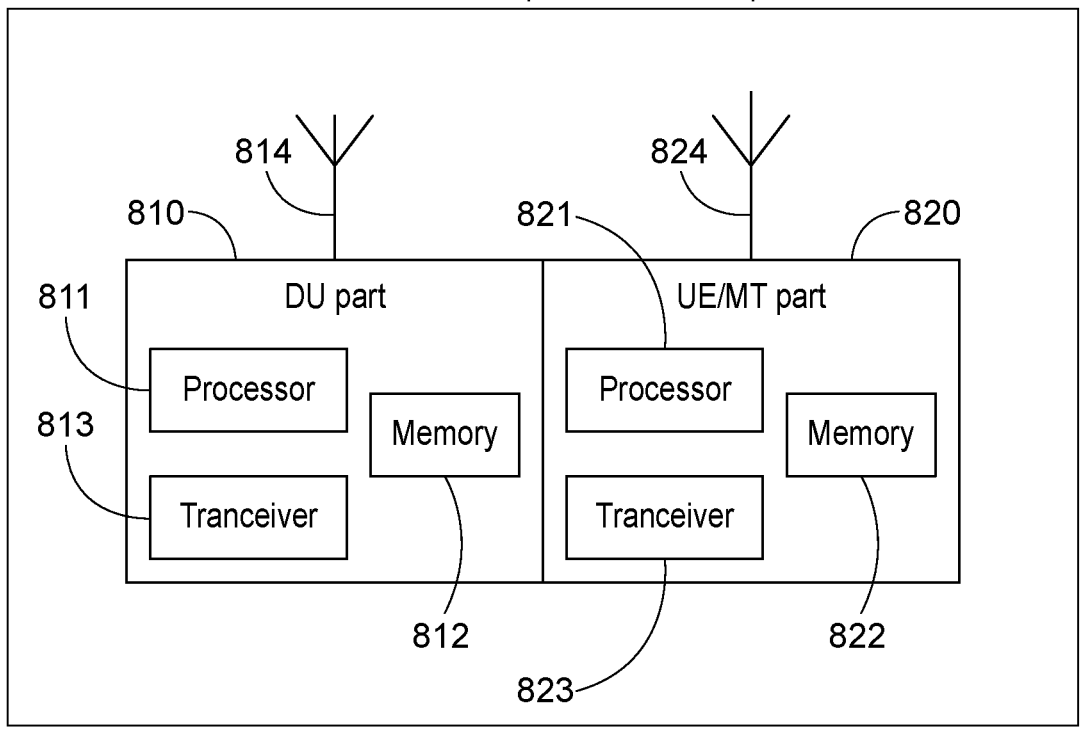
FIG. 8 illustrates an example of a system according to certain embodiments.
Figure 8:
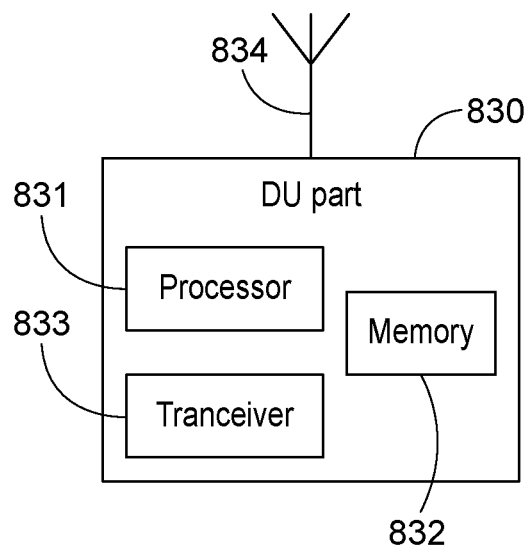

FIG. 4 illustrates an example of a signalling diagram according to some embodiments. Source network entity 420 and/or target network entity 440 may be similar to network entity 830 in FIG. 8, or they may be similar to IAB node 800, which contains both DU part 810 and MT part 820, as illustrated in FIG. 8. Similarly, parent network entity(ies) 430 may also be similar to network entity 830 in FIG. 8, or it may be an IAB node. Although only a single entity is illustrated, parent network entity(ies) 430 may consist of at least one network entity or a tree of several network entities, as illustrated in FIG. 3. Downlink packets originating in parent network entity(ies) 430 may be delivered to source network entity 420 and/or target network entity 440. Furthermore, uplink packets may be delivered from source network entity 420 and/or target network entity 440 to parent network entity(ies) 430. Source network entity 420 and target network entity 440 may also be in communication with each other, such as to perform handover procedures. Such communication may also happen via the parent network entity(ies) 430.

In step 401, source network entity (NE) 420 may receive at least one handover command or UE/IAB node context modification request via parent NE 430. In some embodiments, parent NE 430 may receive the UE/IAB node context modification request from a Donor gNB-CU (not shown in FIG. 4). In step 403, source NE 420 may generate at least one adaptation layer status report in response to the HO or UE/IAB node context modification request.

In some embodiments, the at least one adaptation layer status report may be generated in response to a NE receiving at least one trigger. In some embodiments, the trigger may be a radio link control status report received from user equipment for downlink data. Furthermore, the radio link control status report may be associated with triggering an end-to-end adaptation layer status report. Alternatively or additionally, the trigger may be an adaptation layer status report received from an intermediate parent network entity when the parent NE 420 performs a handover function and/or experiences a network congestion and/or radio link blockage and/or other radio link failure, and uplink data cannot be forwarded on any possible link. In the case of network congestion, radio link blockage, and/or other radio link failure, the trigger may cause at least one adaptation layer status report to be transmitted towards the IAB node serving at least one user equipment transmitting uplink data to network entity. Alternatively or additionally, the trigger may be a change of connection by at least one dual-connected network entity. Alternatively or additionally, the trigger may be a radio link control status report indicating that an RLC ARQ retransmission procedure of an individual hop was unsuccessful, for example, the maximum number of transmissions was reached.

In step 405, source NE 420 may transmit the at least one adaptation layer status report to parent NE 430. In some embodiments, the at least one adaptation layer status report is user equipment bearer-specific. In certain embodiments, the at least one adaptation layer status report includes one or more of at least one user equipment identifier, at least one user equipment specific bearer identifier, and a user equipment bearer identifier indicating at least one of at least one corresponding user equipment and at least one corresponding bearer. In some embodiments, the at least one adaptation layer status report may be associated with at least one packet data convergence protocol sequence number. Furthermore, in certain embodiments, the packet data convergence protocol sequence number length may be signaled with every PDU in an adaptation layer header, or in the general packet radio service tunneling protocol user plane header, and/or may be signaled to each network entity by F1 application protocol or RRC protocol. In certain embodiments, the at least one adaptation layer status report may be transmitted according to at least one configuration associated with the parent network entity.

In some embodiments, source NE 420 and/or intermediate nodes may include an adaptation layer. In some embodiments, the adaptation layer may register successfully and/or unsuccessfully delivered PDCP PDUs. As an example, unsuccessfully delivered PDCP PDUs may include PDCP PDUs which are undelivered/unacknowledged when the at least one adaptation layer status report is triggered and only end nodes of the adaptation layer, including user equipment serving network entities and/or Donor DUs, would also report successfully delivered PDCP PDUs. Furthermore, the adaptation layer may additional contain information about whether the carried radio bearer use unacknowledged mode and/or acknowledged mode, leaving the at least one adaptation layer status report only being triggered for those using acknowledged mode since these are the bearers that require lossless delivery.

Furthermore, the adaptation layer may buffer at least one adaptation layer PDU at each parent NE until an e2e adaptation layer status report may be received, for the purpose of possible retransmission on the same or an alternative route when a report indicating unsuccessful delivery is received. Alternatively, a report indicating unsuccessful delivery may be received and/or no possible path is known for the PDUs, where an intermediate adaptation layer status report may be forwarded further back on the now terminated path. In some embodiments, the adaptation layer buffering could be made configurable, and thus, is implementation dependent.

In some embodiments, the at least one adaptation layer status report may be transmitted according to at least one sequence number, and furthermore, the at least one sequence number may be associated with an outer header of at least one packet data convergence protocol protocol data unit. Additionally, some embodiments may include that the at least one sequence number may be separate from a packet data convergence protocol. In step 407, parent NE 430 may retransmit or reroute at least one adaptation layer PDU to target NE 440.

Figure 5:
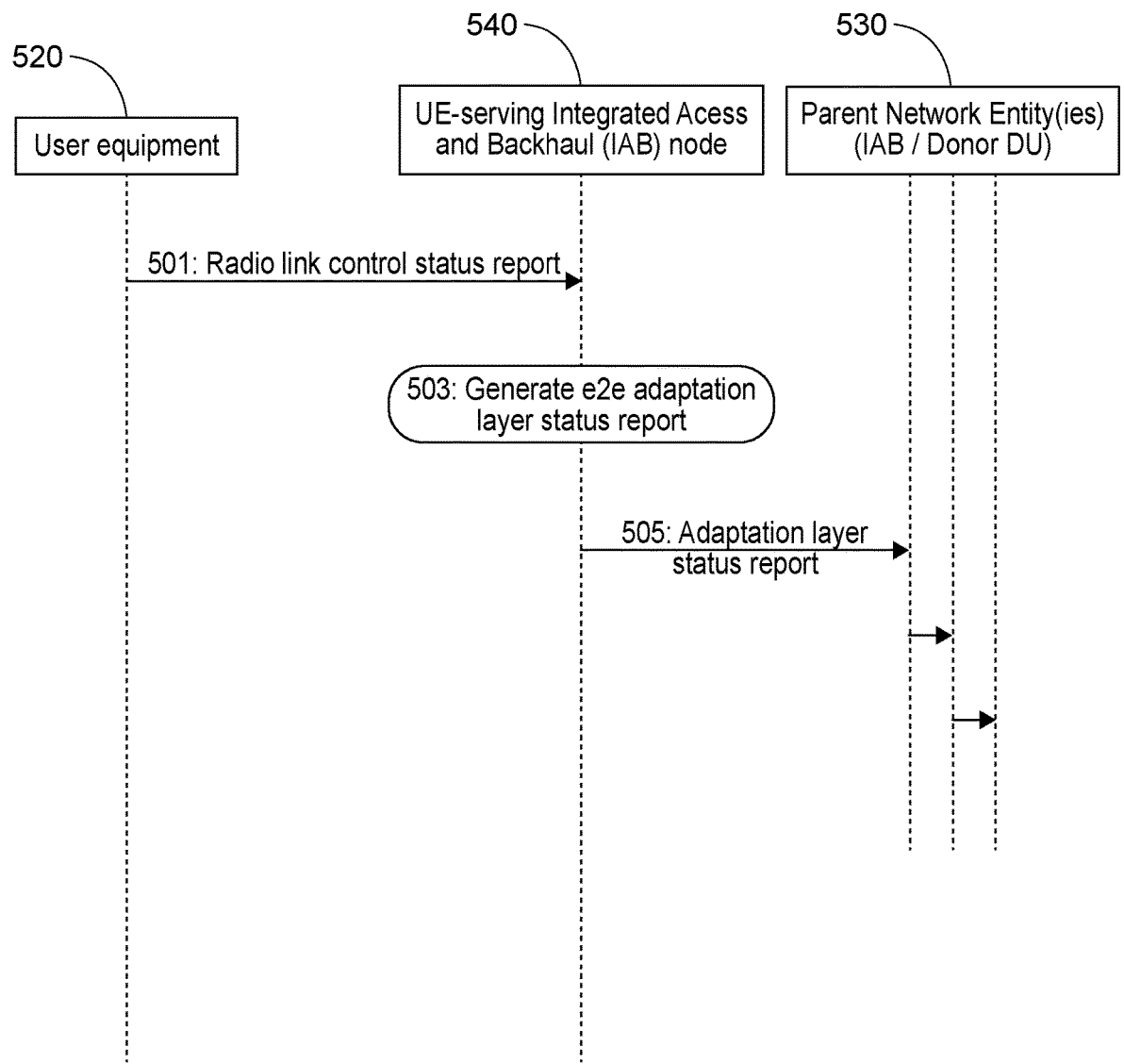
FIG. 5 illustrates another signaling diagram according to certain embodiments.

FIG. 5 illustrates an example of a signalling diagram according to some embodiments. User equipment 520 may be similar to user equipment 820 shown in FIG. 8. A UE-serving integrated access and backhaul (IAB) node 540 may contain both DU part and MT parts, as illustrated in FIG. 8. Parent network entity 530 may be similar to network entity 830 in FIG. 8, or it may be an IAB node in FIG. 8. In step 501, UE 520 may transmit a radio link control (RLC) status report to IAB node 540. In step 503, IAB node 540 may generate at least one adaptation layer status report, which may be an end-to-end adaptation layer status report, and in step 505, IAB node 540 may transmit the adaptation layer status report to parent network entity 530. In some embodiments, parent network entity 530 may be a IAB and/or a donor DU.

Figure 6:
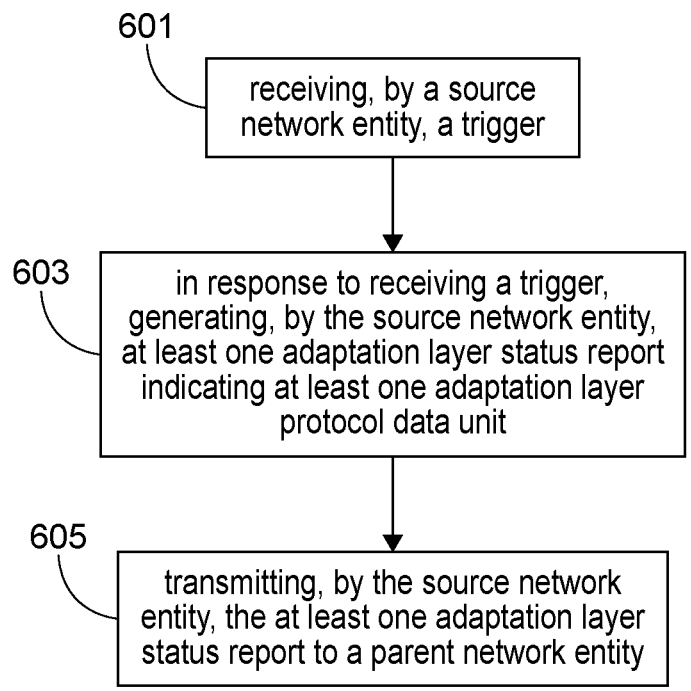
FIG. 6 illustrates an example of a method performed by a network entity according to certain embodiments.

FIG. 6 illustrates an example of a method performed by a NE, such as network entity 830 in FIG. 8, or IAB node 800 in FIG. 8. In step 601, a NE may receive a trigger. In step 603, the NE may, in response to receiving a trigger, generate at least one adaptation layer status report indicating at least one adaptation layer protocol data unit. In some embodiments, the at least one adaptation layer status report is user equipment bearer-specific. In certain embodiments, the at least one adaptation layer status report includes one or more of at least one user equipment identifier, at least one user equipment specific bearer identifier, and a user equipment bearer identifier indicating at least one of at least one corresponding user equipment and at least one corresponding bearer. In some embodiments, the at least one adaptation layer status report may be associated with at least one packet data convergence protocol sequence number. Furthermore, in certain embodiments, the at least one packet data convergence protocol sequence number may be associated with an adaptation layer, general packet radio service tunneling protocol user plane, and/or F1 application protocol. In certain embodiments, the at least one adaptation layer status report may be transmitted automatically and/or the at least one adaptation layer status report may be transmitted according to at least one configuration associated with the parent network entity. In step 605, the NE may transmit the at least one adaptation layer status report to a parent network entity.

Figure 7:
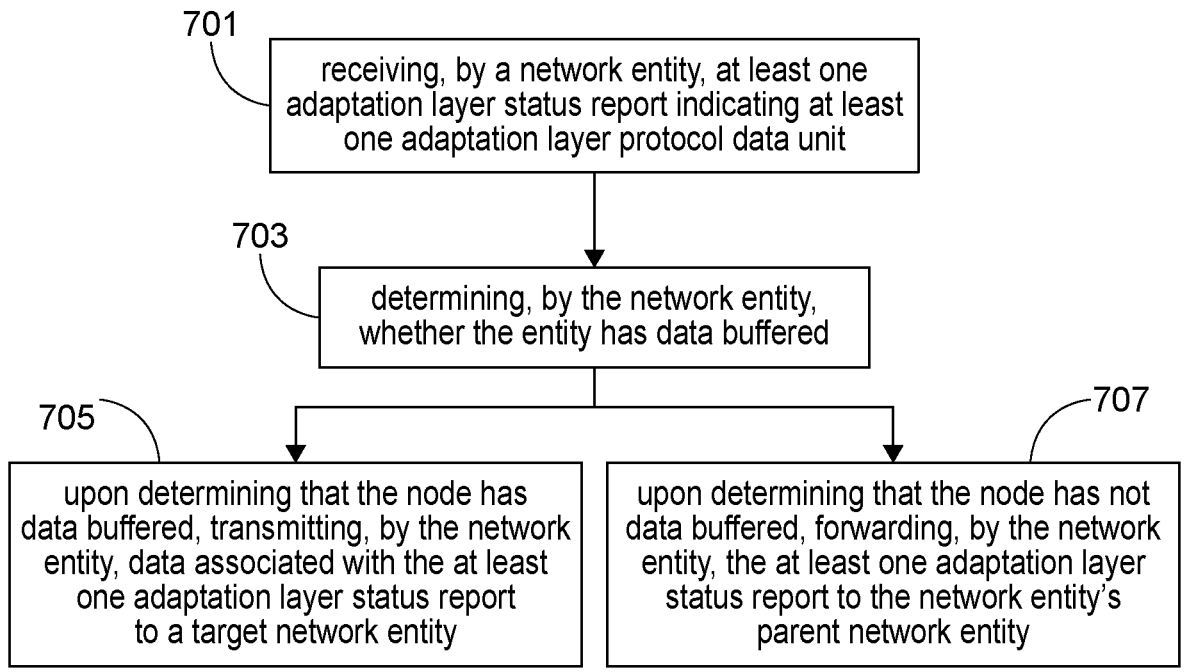
FIG. 7 illustrates another example of a method performed by a network entity according to certain embodiments.

FIG. 7 illustrates an example of a method performed by a NE, such as network entity 830 in FIG. 8, or IAB node 800 in FIG. 8. In step 801, the network entity may receive at least one adaptation layer status report indicating at least one adaptation layer protocol data unit from a source network entity. If the at least one adaptation layer status report signals successful delivery, then the copy of the PDU from the buffer may be cleared. In step 803, the network entity may determine whether the entity has data buffered. Upon determining that the node/network entity has the requested data buffered, in step 805, the network entity may transmit data associated with the at least one adaptation layer status report to a target network entity. Upon determining that the node/NE has not the requested data buffered, the network entity may forward the at least one adaptation layer status report to the network entity's parent network entity, which may repeat step 801. In some embodiments, if the network entity's parent network entity is a UL PDU, the at least one adaptation layer status report may be forwarded to the child NE.

FIG. 8 illustrates an example of a system according to certain embodiments. In one embodiment, a system may include multiple devices, such as, for example, network entity 830 and user equipment 820. FIG. 8 also illustrates an example of an IAB node containing both DU-part and MT/UE-part. In certain embodiments, IAB node 800, may include a MT/UE part which is similar to UE for communication with the donor node or a parent IAB node's DU part, in a multi-hop embodiment, and a DU (or RAN) part which may be similar to a network entity 820 for communication with access UEs or a next hop IAB node MT/UE part. In certain embodiments, therefore, a single IAB node may include at least two processors 811, 821, at least two transceivers 813, 823, at least two memories 812, 822, and at least two antennas 814, 824. In other embodiments the processors, transceivers, memories and/or antennas may be shared between the MT/UE part and the DU/RAN part of the IAB node.

Network entity 810 may be one or more of a base station, such as an evolved node B (eNB) or next generation node B (gNB), a next generation radio access network (NG RAN), a serving gateway, a server, and/or any other access node or combination thereof.

UE 820 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. In some embodiments, network entity 810 and/or user equipment 820 may be a part of a relay node or an IAB node. Multiple relays may be chained together to form a multi-hop-relay network in a relay deployment. Furthermore, a citizens broadband radio service (CBRS) device (CBSD) may include one or more serving cells, such as user equipment 810 and network entity 820. One or more of these devices may include at least one processor, respectively indicated as 811 and 821. At least one memory may be provided in one or more of devices indicated at 812 and 822. The memory may be fixed or removable. The memory may include computer program instructions or computer code contained therein. Processors 811 and 821 and memory 812 and 822 or a subset thereof, may be configured to provide means corresponding to the various blocks of FIGS. 4-7. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 8, transceivers 813 and 823 may be provided, and one or more devices may also include at least one antenna, respectively illustrated as 814 and 824. The device may have many antennas, such as an array of antennas configured for multiple input multiple output (MIMO) communications, or multiple antennas for multiple radio access technologies. Other configurations of these devices, for example, may be provided.

Transceivers 813 and 823 may be a transmitter, a receiver, or both a transmitter and a receiver, or a unit or device that may be configured both for transmission and reception.

Processors 811 and 821 may be embodied by any computational or data processing device, such as a central processing unit (CPU), application specific integrated circuit (ASIC), or comparable device. The processors may be implemented as a single controller, or a plurality of controllers or processors.

Memory 812 and 822 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 4-7). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 4-7. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL GLOSSARY

3GPP 3rd Generation Partnership Project
4G 4th Generation Mobile Network
5G 5th Generation Mobile Network
ARQ Automatic Retransmission Request
CU Centralized Unit
DDDS Downlink Data Delivery Status
DL Downlink DU Distributed Unit
e2e End-to-End
gNB 5G Node B
GTP-U GPRS Tunneling Protocol User Plane
HO Handover
IAB Integrated Access and Backhaul
L2 Layer Two
MAC Medium Access Control
NR New Radio
PBCH Physical Broadcast Channel
PDCCH Physical Downlink Control Channel
PDCP Packet Data Convergence Protocol
PDSCH Physical Downlink Shared Channel
PDU Protocol Data Unit
PHY Physical Layer
RAN Radio Access Network
RLC Radio Link Control
RRC Radio Resource Control
SDAP Service Data Adaptation Protocol
SN Sequence Number
UP Uplink
UE User Equipment According to a first embodiment, a method may include receiving, by a source network entity, a trigger. The method may further include, in response to receiving a trigger, generating, by the source network entity, at least one adaptation layer status report indicating at least one adaptation layer protocol data unit. The method may further include transmitting, by the source network entity, the at least one adaptation layer status report to a parent network entity.

In a variant, the trigger is a radio link control status report received from user equipment for downlink data.

In a variant, the trigger is the successful reception of an uplink PDU at the Donor gNB.

In a further variant, the radio link control status report is associated with triggering an end-to-end adaptation layer status report.

In a variant, the trigger creates an adaptation layer status report received from an intermediate parent network entity when the parent network entity performs a handover function.

In a variant, the trigger comprises determining that uplink data cannot be forwarded on any possible link.

In a further variant, the trigger causes the at least one adaptation layer status report to be transmitted towards at least one user equipment serving network entity for uplink data.

In a variant, the trigger is change of connection by at least one dual-connected network entity.

In a variant, the at least one adaptation layer status report is user equipment bearer-specific.

In a variant, the at least one adaptation layer status report includes one or more of at least one user equipment identifier, at least one user equipment specific bearer identifier, and a user equipment bearer identifier indicating at least one of at least one corresponding user equipment and at least one corresponding bearer.

In a variant, the method may further include transmitting, by the source network entity, multiple adaptation layer status reports multiplexed to the same network node specific radio link control bearer or channel.

In a variant, the at least one adaptation layer status report is associated with at least one packet data convergence protocol sequence number.

In a further variant, the length of the packet data convergence protocol sequence number is signaled in an adaptation layer header, general packet radio service tunneling protocol user plane header, and/or by F1 application protocol.

In a further variant, the at least one sequence number may be associated with an outer header of at least one packet data convergence protocol protocol data unit.

In a further variant, the at least one sequence number may be separate from a packet data convergence protocol.

In a variant, the at least one adaptation layer status report is transmitted automatically after a trigger and/or without a trigger.

In a variant, the at least one adaptation layer status report is transmitted according to at least one configuration associated with the parent network entity.

In a variant, the trigger is a radio link control status report indicating that an RLC ARQ retransmission procedure of an individual hop was unsuccessful by reaching the maximum number of transmissions.

In a variant, the format of the adaptation layer status report is dependent on the trigger.

In a variant, the adaptation layer status report is an end-to-end adaptation layer status report when it is triggered by radio link control status report received from a user equipment.

In a variant, the adaptation layer status report only positively acknowledges when it is triggered by radio link control status report received from a user equipment.

In a variant, the adaptation layer status report only negatively acknowledges when it is triggered by an intermediate node.

According to a second embodiment, a method may include receiving, by a network entity, at least one adaptation layer status report indicating at least one adaptation layer protocol data unit from a source network entity of unsuccessful delivery. The method may further include determining, by the network entity, whether the entity has data buffered. The method may further include, upon determining that the node has data buffered, transmitting, by the network entity, data associated with the at least one adaptation layer status report to a target network entity. The method may further include, upon determining that the node has not data buffered, forwarding, by the network entity, the at least one adaptation layer status report to the network entity's parent network entity.

In a variant, the at least one adaptation layer status report is user equipment bearer-specific.

In a variant, the at least one adaptation layer status report includes one or more of at least one user equipment identifier, at least one user equipment specific bearer identifier, and a user equipment bearer identifier indicating at least one of at least one corresponding user equipment and at least one corresponding bearer.

In a variant, the method may further include receiving, by the target network entity, multiple adaptation layer status reports multiplexed into the same network node specific RLC bearer and/or radio link control channel.

In a variant, the at least one adaptation layer status report is associated with at least one packet data convergence protocol sequence number.

In a further variant, the at least one packet data convergence protocol sequence number is associated with an adaptation layer, general packet radio service tunneling protocol user plane, and/or F1 application protocol.

In a variant, the at least one adaptation layer status report may be received according to at least one sequence number.

In a further variant, the at least one sequence number may be associated with an outer header of at least one packet data convergence protocol protocol data unit.

In a further variant, the at least one sequence number may be separate from a packet data convergence protocol.

In a variant, the at least one adaptation layer status report is received according to at least one configuration associated with the parent network entity.

According to a third embodiment, a method may include receiving, by a network entity, at least one adaptation layer status report indicating at least one adaptation layer protocol data unit from a source network entity. The method may further include buffering, by the network entity, the adaptation layer protocol data units. The method may further include transmitting, by the network entity, data associated with the at least one adaptation layer status report to a target network entity.

In a variant, the method may further include buffering, by the network entity, at least one received adaptation layer protocol data unit.

In a further variant, the method may further include transmitting, by the network entity, at least one received adaptation layer protocol data unit.

In a variant, the method may further include converting, by the network entity, at least one received adaptation layer status report to at least one downlink data delivery status report.

In a further variant, the method may further include transmitting, by the network entity, at least one downlink data delivery status report to a secondary network entity over a F1 user plane protocol interface.

According to a fourth embodiment, a fifth embodiment, and a sixth embodiment, an apparatus can include at least one processor and at least one memory and computer program code. The at least one memory and the computer program code can be configured to, with the at least one processor, cause the apparatus at least to perform a method according to the first embodiment, the second embodiment, and the third embodiment, and any of its variants.

According a seventh embodiment, an eighth embodiment, and a ninth embodiment, an apparatus can include means for performing the method according to the first embodiment, the second embodiment, and the third embodiment, and any of its variants.

According to a tenth embodiment, eleventh embodiment, and twelfth embodiment, a computer program product may encode instructions for performing a process including a method according to the first embodiment, the second embodiment, and the third embodiment, and any of its variants.

According to a thirteenth embodiment, fourteenth embodiment, and fifteenth embodiment, a non-transitory computer-readable medium may encode instructions that, when executed in hardware, perform a process including a method according to the first embodiment, the second embodiment, and the third embodiment, and any of its variants.

According to a sixteenth embodiment, seventeenth embodiment, and eighteenth embodiment, a computer program code may include instructions for performing a method according to the first embodiment, the second embodiment, and the third embodiment, and any of its variants.

According to a thirteenth embodiment and a fourteenth embodiment, an apparatus may include circuitry configured to perform a process including a method according to the first embodiment, the second embodiment, and the third embodiment, and any of its variants.

We claim:

1. A method, comprising:
   receiving, by a source network entity, a trigger;
   generating, in response to receiving the trigger, at least one adaptation layer status report identifying at least one adaptation layer protocol data unit, wherein the at least one adaptation layer protocol data unit is identified with at least one sequence number, wherein a length of the sequence number is signaled in at least one of an adaptation layer header, general packet radio service tunneling protocol user plane header, or F1 application protocol; and
   transmitting the at least one adaptation layer status report to a parent network entity.

2. The method as in claim 1, wherein the trigger is a radio link control status report received from user equipment for downlink data or a successful reception of an uplink protocol data unit at a donor next generation node B.

3. The method as in claim 1, wherein the at least one adaptation layer status report includes at least one user equipment identifier or at least one user equipment bearer identifier.

4. The method as in claim 1, wherein multiple adaptation layer status reports are multiplexed into a source network entity's radio link control bearer or radio link control channel for transmission.

5. An apparatus comprising:
   at least one processor; and
   at least one memory comprising computer program code,
   the at least one memory and computer program code being configured, with the at least one processor, to cause the apparatus at least to:
   receive a trigger;
   generate, in response to receiving the trigger, at least one adaptation layer status report identifying at least one adaptation layer protocol data unit, wherein the at least one adaptation layer protocol data unit is identified with at least one sequence number, wherein a length of the sequence number is signaled in at least one of an adaptation layer header, general packet radio service tunneling protocol user plane header, or F1 application protocol; and
   transmit the at least one adaptation layer status report to a parent network entity.

6. The apparatus as in claim 5, wherein the trigger is a radio link control status report received from a user equipment for downlink data or a successful reception of an uplink protocol data unit at a donor next generation node B.

7. The apparatus as in claim 6, wherein the radio link control status report indicates that a radio link control automatic repeat request retransmission procedure of an individual hop was unsuccessful by reaching a maximum number of transmissions.

8. The apparatus as in claim 5, wherein the at least one adaptation layer status report includes at least one user equipment identifier or at least one user equipment bearer identifier.

9. The apparatus as in claim 5, wherein the adaptation layer status report is an end-to-end adaptation layer status report when the trigger is a radio link control status report received from a user equipment.

10. The apparatus as in claim 5, wherein the at least one adaptation layer status report is transmitted automatically after a trigger, without a trigger, or according to at least one configuration associated with the parent network entity.

11. The apparatus as in claim 5, wherein the adaptation layer status report only positively acknowledges when the trigger is a radio link control status report received from a user equipment and only negatively acknowledges when the trigger is received from an intermediate node.

12. The apparatus as in claim 5, wherein multiple adaptation layer status reports are multiplexed into the apparatus's radio link control bearer or radio link control channel for transmission.

13. The apparatus as in claim 5, wherein the sequence number is specified in an outer header of a packet data convergence protocol protocol data unit.

14. An apparatus comprising:
at least one processor; and
at least one memory comprising computer program code, the at least one memory and computer program code being configured, with the at least one processor, to cause the apparatus at least to:
receive at least one adaptation layer status report identifying at least one adaptation layer protocol data unit from a source network entity of unsuccessful delivery, wherein the at least one adaptation layer protocol data unit is identified with at least one sequence number, wherein a length of the sequence number is signaled in at least one of an adaptation layer header, general packet radio service tunneling protocol user plane header, or F1 application protocol;
determine whether the apparatus has data buffered;
transmit data associated with the at least one adaptation layer status report to a target network entity upon determining that the apparatus has data buffered; and
forward the at least one adaptation layer status report to the apparatus's parent network entity upon determining that the apparatus has no data buffered.

15. The apparatus as in claim 14, wherein the at least one adaptation layer status report includes at least one user equipment identifier or at least one user equipment bearer identifier.

16. The apparatus as in claim 14, wherein multiple adaptation layer status reports are multiplexed into the received adaptation layer status report from a source network entity's radio link control bearer or radio link control channel.

17. The apparatus as in claim 14, wherein the sequence number is specified in an outer header of a packet data convergence protocol protocol data unit.

18. An apparatus comprising:
at least one processor; and
at least one memory comprising computer program code,
the at least one memory and computer program code being configured, with the at least one processor, to cause the apparatus at least to:
receive a trigger, wherein the trigger is a radio link control status report received from a user equipment for downlink data or a successful reception of an uplink protocol data unit at a donor next generation node B, and wherein the radio link control status report indicates that a radio link control automatic repeat request retransmission procedure of an individual hop was unsuccessful by reaching a maximum number of transmissions;
generate, in response to receiving the trigger, at least one adaptation layer status report identifying at least one adaptation layer protocol data unit; and
transmit the at least one adaptation layer status report to a parent network entity.

* * * * *